US008711407B2

(12) United States Patent
Partridge et al.

(10) Patent No.: US 8,711,407 B2
(45) Date of Patent: Apr. 29, 2014

(54) METHOD FOR GENERATING OPTICAL CODES FOR A PRINT-CONTEXT

(75) Inventors: Kurt E. Partridge, Palo Alto, CA (US); Leigh L. Klotz, Jr., Palo Alto, CA (US); James M. A. Begole, Los Altos, CA (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 198 days.

(21) Appl. No.: 13/079,655

(22) Filed: Apr. 4, 2011

(65) Prior Publication Data

US 2012/0250065 A1 Oct. 4, 2012

(51) Int. Cl.
*G06F 3/12* (2006.01)

(52) U.S. Cl.
USPC ......... 358/1.15; 358/1.18; 358/1.14; 709/206

(58) Field of Classification Search
USPC ............... 358/1.15, 1.13, 1.18, 1.14; 709/206
See application file for complete search history.

(56) References Cited

U.S. PATENT DOCUMENTS

| 7,168,036 | B2 | 1/2007 | Klotz, Jr. | |
| 7,455,229 | B2 * | 11/2008 | Tanaka | 235/462.01 |
| 7,822,411 | B2 * | 10/2010 | Nakatani | 455/420 |
| 8,040,542 | B2 * | 10/2011 | Oda et al. | 358/1.14 |
| 2003/0063309 | A1 * | 4/2003 | Parry | 358/1.15 |
| 2003/0197887 | A1 * | 10/2003 | Shenoy et al. | 358/1.15 |
| 2004/0185877 | A1 * | 9/2004 | Asthana et al. | 455/456.6 |
| 2006/0086800 | A1 * | 4/2006 | Watanabe et al. | 235/462.13 |
| 2007/0086051 | A1 * | 4/2007 | Kunori | 358/1.15 |
| 2007/0116358 | A1 * | 5/2007 | Klotz et al. | 382/175 |
| 2007/0133843 | A1 * | 6/2007 | Nakatani | 382/115 |
| 2007/0192438 | A1 * | 8/2007 | Goei | 709/219 |
| 2007/0201081 | A1 * | 8/2007 | Murayama | 358/1.15 |
| 2008/0278753 | A1 * | 11/2008 | Oda et al. | 358/1.15 |
| 2009/0106380 | A1 * | 4/2009 | Asthana et al. | 709/206 |
| 2009/0293110 | A1 * | 11/2009 | Koga | 726/6 |
| 2010/0309504 | A1 * | 12/2010 | Partridge et al. | 358/1.15 |
| 2010/0309505 | A1 * | 12/2010 | Partridge et al. | 358/1.15 |
| 2011/0085196 | A1 * | 4/2011 | Liu et al. | 358/1.15 |
| 2011/0096354 | A1 * | 4/2011 | Liu | 358/1.15 |
| 2012/0002239 | A1 * | 1/2012 | Okamura | 358/1.15 |

* cited by examiner

*Primary Examiner* — Dennis Dicker
(74) *Attorney, Agent, or Firm* — Shun Yao; Park, Vaughan, Fleming & Dowler LLP

(57) ABSTRACT

One embodiment provides a system for printing a document from a portable device. During operation, the system captures an image of an optical code that identifies a printing device, wherein the optical code is displayed on a panel of the printing device or is printed by the printing device. Next, the system transfers information identifying the printing device to a remote printing service, thereby allowing the remote printing service to print a document at the printing device.

20 Claims, 5 Drawing Sheets

METHOD FOR GENERATING OPTICAL CODES FOR A PRINT-CONTEXT

BACKGROUND

1. Field

The present disclosure relates generally to communication among peripheral devices. More specifically, the present disclosure relates to a method and system for printing documents from a portable device using optical codes to identify the printing device.

2. Related Art

The proliferation of portable devices is changing the way people work. For example, people receive emails with document attachments that can include large documents, presentation slides, and schedules. Typically, such attachments are difficult to read on the portable device because of limited screen sizes. At the same time, printing from the portable device is difficult for several reasons. The portable device might not have enough memory or computing power to support printer drivers. A printer driver designed for the operating system on the portable device might not be available. The portable device is often required to discover nearby printers in a new environment, which can be time-consuming and might not always be successful. Furthermore, the portable device might not have secure network access to the printer, thus introducing security concerns in the printing process.

Current solutions to the problems inherent in printing from a portable device are complicated. A portable device must follow a complicated series of steps, including discovering the printer, downloading software drivers, creating an account, uploading documents, logging into the printer, and selecting documents. In addition, printing from a portable device requires new, costly and/or retrofitted hardware, such as Bluetooth®, WiFi®, RFID, NFC, USB, and IrDA.

SUMMARY

One embodiment provides a system for printing a document from a portable device. During operation, the system captures an image of an optical code that identifies a printing device, wherein the optical code is displayed on a panel of the printing device or is printed by the printing device. Next, the system transfers information identifying the printing device to a remote printing service, thereby allowing the remote printing service to print a document at the printing device.

In some embodiments, the optical code contains a name or IP address of the printing device.

In some embodiments, the optical code expires after a predetermined period of time.

In some embodiments, the optical code expires after a predetermined number of uses.

In some embodiments, the optical code is a QR Code.

In some embodiments, the system transfers user credentials to the remote printing service for authentication and/or billing.

In a variant of the embodiment, the user credentials include one or more of: a user identifier, a timestamp, and a digital signature of the user identifier and the timestamp.

In some embodiments, the system transfers the document to be printed or a location of the document to be printed to the remote printing service.

BRIEF DESCRIPTION OF THE FIGURES

In the figures, like reference numerals refer to the same figure elements.

DETAILED DESCRIPTION

Figure 1:
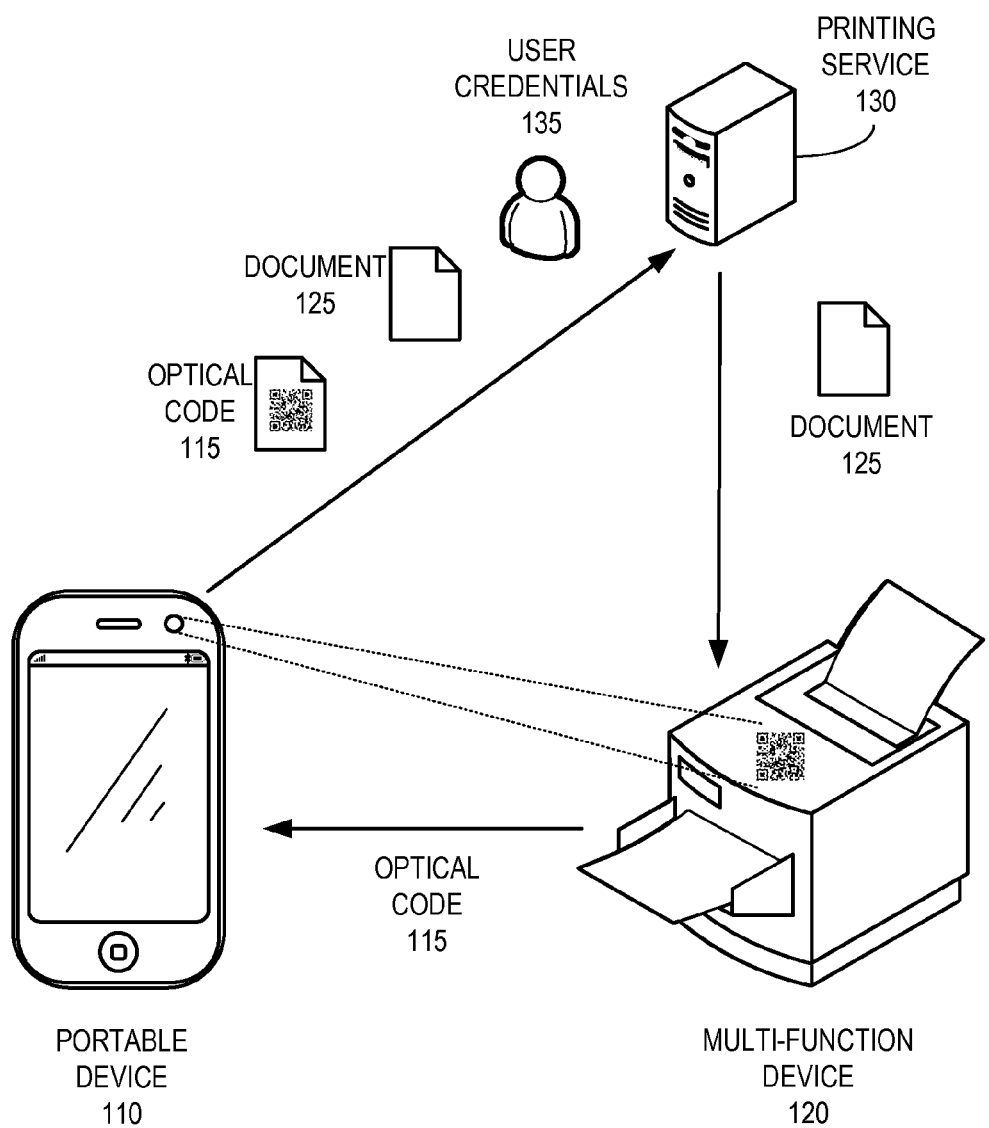
FIG. 1 illustrates an exemplary system for printing documents from a portable device, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of printing a document from a portable device using a remote printing service. Without local access to a printer, the portable device obtains with an attached camera an optical code identifying the printer. The user of the portable device then transfers the printer identifier contained in the optical code, as well as the document to be printed or information indicating a location of the document, to the printing service. Based on the printer identifier, the printing service transfers the document to the corresponding printer for printing. In addition, the printing service can authenticate and/or bill the user for printing.

This basic idea of using an optical code to identify a printer for printing from a portable device can be applied in different computing environments. One such example is illustrated by the document-printing system shown in FIG. 1, which facilitates printing a document from a portable device in accordance with an embodiment. In this example, the user of a portable device 110 wishes to print a document 125 at a multi-function device (MFD) 120, to which portable device 110 has no network access. However, MFD 120 interacts with a remote printing service 130 that allows authenticated users to print to user-specified printers. In order to print, the user needs to obtain identification information for MFD 120, which displays an optical code 115 identifying itself on its display panel. In some embodiments, optical code 115 can be attached to the external case of MFD 120, so that it can be easily visible to a user. The user of portable device 110 captures optical code 115 using a camera on the portable device, and sends optical code 115, together with document 125 and optionally user credentials 135, to printing service 130. In one embodiment, instead of sending document 125, MFD 120 can send an identifier that indicates the location of document 125 (e.g., a URL), which allows printing service 130 to retrieve document 125. Once the user is authenticated, printing service 130 transfers document 125 to MFD 120 identified by optical code 115 for printing. Subsequently, MFD 120 prints document 125, and printing service 130 may charge the user a printing fee and optionally notify the user that the printing job is complete.

The printer identification information encoded in optical code 115 may be a name or an Internet Protocol (IP) address of the printer. Decoding of optical code 115 can be performed by portable device 110 itself, or by remote printing service 130. Moreover, optical code 115 can be any optical representation of information that can be captured and recognized by any image device, such as a camera on a portable device. Typical optical codes include, but are not limited to: one-dimensional barcodes, two-dimensional barcodes (also called matrix codes, such as the "Quick Response" or "QR" codes), and data glyphs. The encoding of the information in the optical code follows well-known techniques, such as Unix-to-Unix encoding (uuencoding) or multipart Multipurpose Internet Mail Extensions (MIME) protocols.

The document-print system illustrated in the example in FIG. 1 offers several benefits. First, remote printing service 130 facilitates a secure and economic printing environment. As long as the user of portable device 110 provides proper credentials, the document transfer and printing can be performed and charged accordingly. Furthermore, the system works on any portable device with a camera that can capture optical code 115. In addition, the optical code that encodes the printer identification information can also serve the purpose of authentication for printing.

Note that this disclosure uses the term "printer optical code" interchangeably with "optical code." Furthermore, the terms "printer" and "multi-function device" are also used interchangeably in this disclosure. Functions, methods, and operations described in this disclosure to be performed by a printer or an MFD can also be performed by a computer associated with the printer or MFD.

Secure "Internet Fax"

In the exemplary document-printing system illustrated in FIG. 1, the printer identifier, such as a name or an IP address, may be encoded in the optical code. It is possible for the portable device to send documents directly to the printer for printing. Many printers nowadays support a function called "Internet fax," which allows a printer to receive and print anything sent to a specific email address associated with the printer. However, this functionality is rarely enabled for security reasons. If the email address associated with a printer is leaked to the public, the printer becomes extremely vulnerable to attacks in which an adversary can force the printer to print a large number of pages, thereby causing a denial of service to the intended users and potential financial losses.

In some embodiments, the document-printing system can be built upon the "Internet fax" technology and adds a remote printing service to make it secure. The "Internet fax" functionality is enabled on all participating printers, but the specific email addresses associated with the printers are not disclosed to end-users. Instead, users are required to register at the printing service and can print only if they submit proper credentials to the printing service. As part of the process, the printing service may also charge users printing fees based on usage.

The printing service demands the following information from the user of the portable device:
1) the document to be printed, or a reference to the location of the document such as a hyperlink that the printing service is able to access;
2) the user's credentials comprising a user identifier, a timestamp, and a digital signature of the user identifier and the timestamp encrypted by the user's private key; and
3) an identifier of the target printer.

As shown in FIG. 1, the printer identifier, such as a name or an IP address of the printer, is encoded in an optical code. The optical code may be obtained by taking an image of the optical code from the display panel of the printer. A printer with no display panel may produce a printed copy of the optical code through the printing service. In this process, the printer sends a request for the optical code to the printing service. The printing service checks the sender's email address which is associated with printer, retrieves the printer name or the IP address, generates an optical code containing the printer identification information, and sends the optical code back to the printer to be printed. Once the printed copy of the optical code is affixed to the printer for future use, there is no need to repeat this process of acquiring the optical code until the optical code is expired. For security reasons, the printing service may update optical codes associated with the participating printers periodically to limit the time period or number of times these optical codes can be used. Furthermore, the user of the portable device can initiate the request for the optical code if the optical code is not present on the printer. In response to the user request, the printer may either display the optical code on the panel, or print a hard copy of the optical code using the above process.

In some embodiments, the portable device may send the optical code containing the printer identifier directly to the printing service. The printing service then decodes the optical code and identifies the target printer. In other embodiments, after a portable device has captured and decoded the optical code, it sends the decoded printer identifier to the printing service. Furthermore, the portable device can use the printer identifier to populate a "recent printers" list for other applications. The decoded printer identifier can also be integrated into a persistent configuration of the portable device as part of a seamless mobile printing experience for the user.

In some embodiments, the portable device communicates with the printing service via emails. In other embodiments, this communication may be carried out through a custom TCP/IP connection from a dedicated print driver. In this case, administrators of the printing service have to ensure that the TCP/IP connection is not blocked by firewalls or other network security mechanisms located on the communication links between the portable device and the printing service.

The printing service may rely on any single sign-on authentication mechanism, such as OpenID to verify the user's credentials. The printing service allows a printing job only if the user is on a whitelist of users who are authorized to access the printer. Alternatively, one user may lend his credentials to other users by generating a QR code that not only identifies the printer but also contains the user's credentials. Other users can conveniently print documents with the QR code generated by the lender.

Optionally, the printing service may send a notification to the user of a completed printing job. This is desirable especially when the user would like to receive a reminder to pick up the documents rather than waiting in front of the printer. If the printing service denies a user's printing request, it could print an error message indicating the reason for failure at the target printer, so the user is notified of the outcome of his printing request. The printing service may also monitor the number of invalid print requests sent from a user or an IP address. If the number of invalid requests exceeds a threshold, the printing service will stop printing out error messages and notify the system administrators of potential denial-of-service attacks.

System Operation

Figure 2:
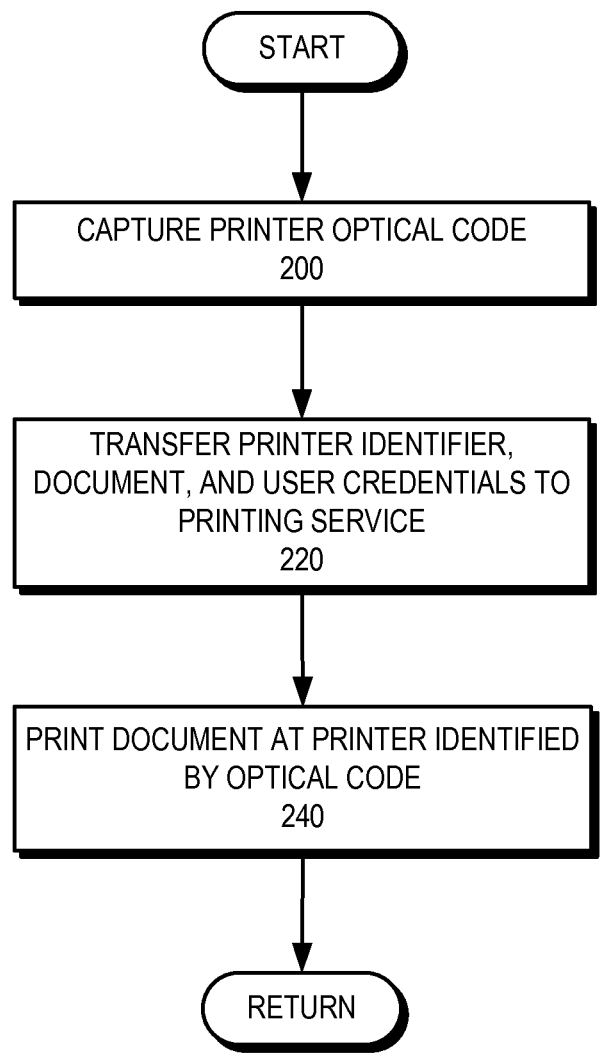
FIG. 2 presents a flow chart illustrating the process of printing a document from a portable device, in accordance with an embodiment of the present invention.

FIG. 2 presents a flow chart illustrating the process of printing a document from a portable device in accordance with an embodiment. During operation, the portable device captures an image of an optical code that identifies a printer (operation 200). The portable device then transfers the printer identifier, the document to be printed, and user credentials to the printing service (operation 220). Next, the document is printed at the printer identified by the optical code (operation 240). Note that a location of the document may be sent to the printing service from the portable device instead of the document itself.

Figure 3:
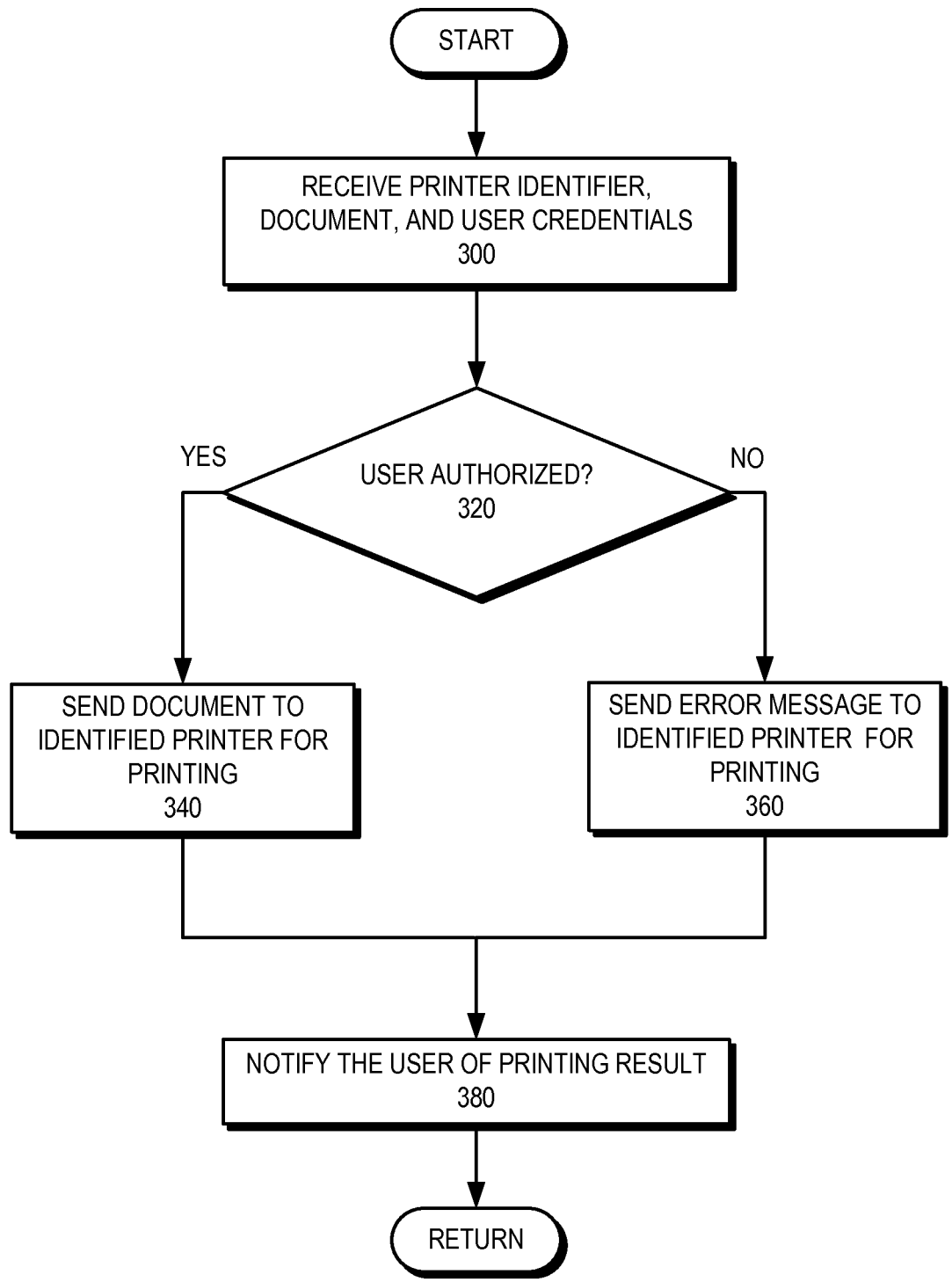
FIG. 3 presents a flow chart illustrating the process of printing a document at a remote printing service, in accordance with an embodiment of the present invention.

FIG. 3 presents a flow chart illustrating the process of printing a document at a remote printing service in accordance with an embodiment. During operation, the printing service receives a printer identifier, a document to print, and user credentials from a portable device (operation 300). The printing device then determines whether the user is authorized to perform the printing task (operation 320). If not, the printing service sends an error message to the identified printer for printing (operation 360). Otherwise, the printing service sends the document to the identified printer for printing (operation 340). Finally, the printing service notifies the user of the result of the printing job (operation 380). Additional details of the process of notifying the user of the printing result can be found, for example, in U.S. Pat. No. 7,057,752, entitled "Methods and Systems for Providing Status Information for Reprographic Operations," by inventor Leigh L. Klotz Jr., which is incorporated by reference herein.

Figure 4:
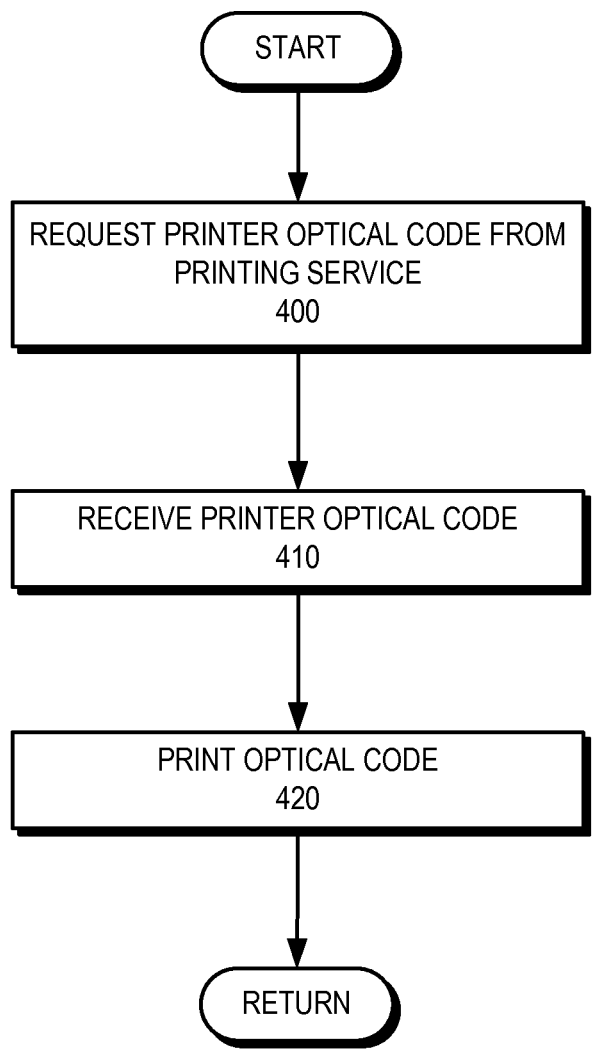
FIG. 4 presents a flow chart illustrating the process of printing the optical codes, in accordance with an embodiment of the present invention.

FIG. 4 presents a flow chart illustrating the process of printing the optical code in accordance with an embodiment. During operation, the MFD requests an optical code from the printing service (operation 400). Next, the MFD receives the optical code from the printing service (operation 410). The MFD then prints the optical code identifying itself (operation 420).

Exemplary Portable Device

Figure 5:
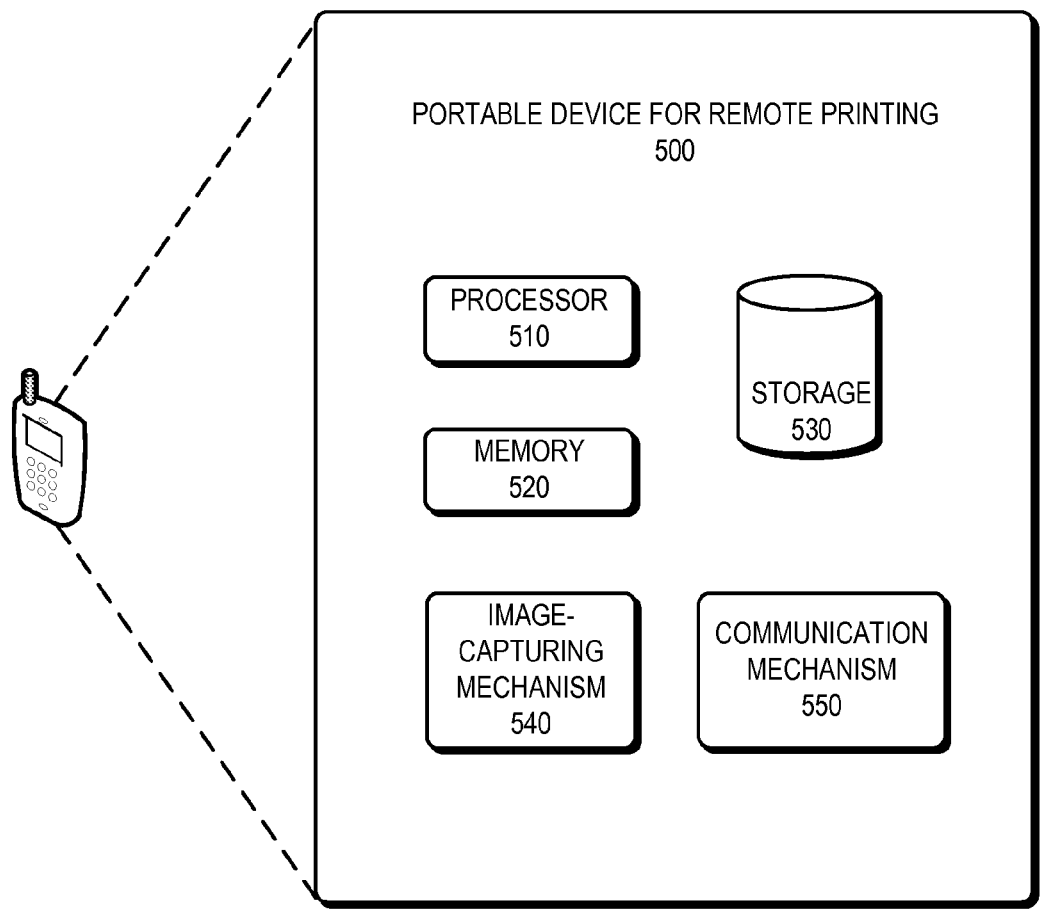
FIG. 5 illustrates an exemplary portable device for printing a document using a remote printing service, in accordance with an embodiment of the present invention.

FIG. 5 presents an exemplary portable device for printing a document using a remote printing service in accordance with an embodiment. Portable device 500 for remote printing comprises a processor 510, a memory 520, a storage 530, an image-capturing mechanism 540, and a communication mechanism 550, all of which can be in communication with each other through various means.

Storage 530 stores programs to be executed by processor 510. Specifically, storage 530 stores a program that implements a system (application) for printing a document from a portable device using a remote printing service. During operation, the application program can be loaded from storage 530 into memory 520 and executed by processor 510. As a result, portable device 500 for document printing can perform the functions described above.

During operation, image-capturing mechanism 540 captures an image of an optical code that identifies a printing device. Subsequently, communication mechanism 550 transfers information identifying the printing device to a remote printing service. As a result, the remote printing service can print a document at the printing device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for printing a document from a portable computing device, the method comprising:

capturing, by the portable computing device, an image of an optical code that identifies a printing device, wherein the portable computing device does not have network access to the printing device, and wherein capturing the optical code involves capturing an image displayed on a panel of the printing device or printed by the printing device;

decoding the optical code to obtain information identifying the printing device; and sending a print-request email to a remote printing service that is not a printing device to print the document at the printing device, wherein the print-request email includes the document or a location identifier of the document, credentials for printing at the printing device, and the decoded information identifying the printing device.

2. The method of claim 1, wherein the optical code contains a name or IP address of the printing device.

3. The method of claim 1, wherein the optical code expires after a predetermined period of time.

4. The method of claim 1, wherein the optical code expires after a predetermined number of uses.

5. The method of claim 1, wherein the optical code is a QR Code.

6. The method of claim 1, further comprising transferring user credentials to the remote printing service for authentication and/or billing.

7. The method of claim 6, wherein the user credentials include one or more of: a user identifier, a timestamp, and a digital signature of the user identifier and the timestamp.

8. An apparatus for printing a document from a portable computing device, the apparatus comprising:

an image-capturing mechanism of the portable computing device, wherein the image-capturing mechanism is configured to capture an image of an optical code that identifies a printing device, wherein the portable computing device does not have network access to the printing device, and wherein capturing the optical code involves capturing an image displayed on a panel of the printing device or printed by the printing device;

a decoding mechanism configured to decode the optical code to obtain information identifying the printing device; and a communication mechanism configured to send a print-request email to a remote printing service that is not a printing device to print the document at the printing device, wherein the print-request email includes the document or a location identifier of the document, credentials for printing at the printing device, and the decoded information identifying the printing device.

9. The apparatus of claim 8, wherein the optical code contains a name or IP address of the printing device.

10. The apparatus of claim 8, wherein the optical code expires after a predetermined period of time.

11. The apparatus of claim 8, wherein the optical code expires after a predetermined number of uses.

12. The apparatus of claim 8, wherein the optical code is a QR Code.

13. The apparatus of claim 8, wherein while transferring information identifying the printing device, the communication mechanism is further configured to transfer user credentials to the remote printing service for authentication and/or billing.

14. The apparatus of claim 13, wherein the user credentials include one or more of: a user identifier, a timestamp, and a digital signature of the user identifier and the timestamp.

15. A non-transitory computer-readable storage device storing instructions that when executed by a computer cause the computer to perform a method for printing a document from a portable computing device, the method comprising:

capturing an image of an optical code that identifies a printing device, wherein the portable computing device does not have network access to the printing device, and wherein capturing the optical code involves capturing an image displayed on a panel of the printing device or printed by the printing device;

decoding the optical code to obtain information identifying the printing device; and sending a print-request email to a remote printing service that is not a printing device to print the document at the printing device, wherein the print-request email includes the document or a location identifier of the document, credentials for printing at the printing device, and the decoded information identifying the printing device.

16. The computer-readable storage device of claim 15, wherein the optical code contains a name or IP address of the printing device.

17. The computer-readable storage device of claim 15, wherein the method further comprises transferring user credentials to the remote printing service for authentication and/or billing.

18. The method of claim 1, further comprising:

receiving, by the remote printing service, a location identifier of the document and a user credential;

determining that the user is authorized to print the document at the identified printing device based on the user credential;

retrieving the document based on the location identifier; and transferring the document to the identified printing device for printing.

19. The method of claim 1, wherein the credentials include user credentials for a local user of the portable device; and wherein the method further comprises:

generating an optical code that identifies the printing device and includes the credentials for printing at the printing device; and providing the generated optical code to a remote user, which facilitates the remote user to print a document at the printing device using the local user's credentials.

20. The method of claim 1, further comprising:

responsive to receiving a notification from the remote printing service indicating that the print job has completed, presenting a reminder for a local user to obtain the printed document from the printing device.

\* \* \* \* \*